United States Patent
Farrugia

(10) Patent No.: US 9,981,629 B2
(45) Date of Patent: May 29, 2018

(54) CHILD RESTRAINT SYSTEM FOR USE IN VEHICLES

(71) Applicant: Darren Joseph Farrugia, Lithuania, FL (US)

(72) Inventor: Darren Joseph Farrugia, Lithuania, FL (US)

(*) Notice: Subject to any disclaimer, the term of this patent is extended or adjusted under 35 U.S.C. 154(b) by 0 days. days.

(21) Appl. No.: 15/242,046

(22) Filed: Aug. 19, 2016

(65) Prior Publication Data

US 2017/0050611 A1 Feb. 23, 2017

Related U.S. Application Data

(60) Provisional application No. 62/207,890, filed on Aug. 20, 2015.

(51) Int. Cl.
  *B60R 22/00* (2006.01)
  *B60R 22/10* (2006.01)
  *B60R 22/02* (2006.01)

(52) U.S. Cl.
  CPC ...... *B60R 22/105* (2013.01); *B60R 2022/027* (2013.01)

(58) Field of Classification Search
  CPC .................. B60R 22/105; B60R 2022/027
  USPC .................................................. 297/464, 484
  See application file for complete search history.

(56) References Cited

U.S. PATENT DOCUMENTS

| | | | | |
|---|---|---|---|---|
| 1,898,090 A | * | 2/1933 | Lethern | B64D 25/06 297/484 |
| 2,403,653 A | * | 7/1946 | Geohegan | B60R 22/185 297/484 X |
| 2,634,802 A | * | 4/1953 | Stumm | B60N 2/688 297/484 X |
| 2,845,234 A | * | 7/1958 | Cushman | B60R 22/415 297/484 X |
| 2,856,991 A | * | 10/1958 | Princiotta | B60R 22/02 297/484 |
| 3,099,486 A | * | 7/1963 | Scott | A47D 15/006 297/484 X |
| 3,218,104 A | * | 11/1965 | Putman | B60R 22/02 297/484 X |
| 3,321,247 A | * | 5/1967 | Dillender | A47D 15/006 297/484 X |

(Continued)

OTHER PUBLICATIONS

PCT; International Search Report and Written Opinion dated Nov. 3, 2016 in Application No. PCT/US2016/047896.

*Primary Examiner* — Rodney B White
(74) *Attorney, Agent, or Firm* — Snell & Wilmer L.L.P.

(57) ABSTRACT

Systems for retraining an occupant within a vehicle seat as disclosed herein include a lap belt having connectable lap-belt segments along a seat bottom extending from respective connection points with the seat or the vehicle. A connection element extends upwardly along a seat back from an attachment point to a connecting member, and shoulder straps extend from the connecting member for placement over the occupant's shoulders when seated within the vehicle seat. The lap-belt segments may be connected directly or indirectly with the shoulder straps, and shoulder strap length may be adjusted via the lap-belt segments or an intermediate element used to connect the lap-belt segments with the shoulder straps. A vertical belt extends from the connecting member along the back portion of the vehicle seat to an attachment point within the vehicle.

20 Claims, 4 Drawing Sheets

(56) References Cited

U.S. PATENT DOCUMENTS

| | | | |
|---|---|---|---|
| 3,367,715 A * | 2/1968 | Curran | B60R 22/22 297/484 |
| 3,385,633 A * | 5/1968 | Aizley | B60R 22/02 297/484 X |
| 3,463,545 A * | 8/1969 | Curran | B60R 22/02 297/484 X |
| 3,512,830 A * | 5/1970 | Norman | B60N 2/2809 297/484 X |
| 3,561,817 A * | 2/1971 | Needham | B60R 22/195 297/484 X |
| 3,633,965 A * | 1/1972 | Norman | B60R 22/02 297/484 X |
| 3,819,197 A | 6/1974 | Shakespear | |
| 3,834,758 A * | 9/1974 | Soule | B60R 22/105 297/484 X |
| 3,887,233 A * | 6/1975 | Garavaglia | B60R 22/26 297/484 X |
| 3,954,280 A * | 5/1976 | Roberts | B60R 22/105 297/484 X |
| 4,099,770 A | 7/1978 | Elsholz et al. | |
| 4,099,778 A * | 7/1978 | Lehr | B60R 22/105 297/484 X |
| 4,145,074 A * | 3/1979 | Hendricks | A61H 1/0218 297/484 X |
| 4,175,787 A * | 11/1979 | Muskat | B60R 22/02 297/484 |
| 4,231,616 A | 11/1980 | Painter | |
| 4,396,228 A * | 8/1983 | Go | B60R 22/02 297/484 X |
| 4,709,966 A | 12/1987 | Parkinson et al. | |
| 5,524,928 A * | 6/1996 | Monagas | B60R 22/02 297/484 X |
| 5,649,744 A * | 7/1997 | Apodaca | B60R 22/02 297/484 |
| 6,109,698 A * | 8/2000 | Perez | B60N 2/265 297/484 X |
| 6,402,251 B1 * | 6/2002 | Stoll | B60N 2/265 297/484 X |
| 6,547,334 B1 * | 4/2003 | Girardin | B60R 22/105 297/484 X |
| 6,616,242 B1 * | 9/2003 | Stoll | B60N 2/265 297/484 X |
| 7,347,494 B2 * | 3/2008 | Boyle | B60N 2/2806 297/464 X |
| 8,210,617 B2 * | 7/2012 | Aaron | B60N 2/2833 297/484 X |
| 8,469,400 B2 * | 6/2013 | Merrill | B60N 2/24 297/484 X |
| 2007/0001495 A1 * | 1/2007 | Boyle | B60N 2/2806 297/484 X |
| 2007/0040441 A1 | 2/2007 | Boyle et al. | |
| 2007/0102991 A1 * | 5/2007 | DeLellis | B60R 22/02 297/484 |
| 2013/0249204 A1 | 9/2013 | Fink et al. | |
| 2015/0069813 A1 * | 3/2015 | Furr | B60R 22/00 297/484 |
| 2015/0123449 A1 * | 5/2015 | Crews | B60R 22/105 297/468 |

* cited by examiner

CHILD RESTRAINT SYSTEM FOR USE IN VEHICLES

CROSS-REFERENCE TO RELATED APPLICATIONS

This patent application claims the benefit of U.S. Provisional Patent Application No. 62/207,890 filed Aug. 20, 2015, which application is hereby incorporated by reference in its entirety.

FIELD

Restraint systems as disclosed herein relate generally to passenger restraint systems for use in vehicles, and more particularly, to add-on restraint systems for older children.

BACKGROUND

Conventional vehicle restraint or seat belt systems combining a lap belt and an upper torso or shoulder belt to restrain an occupant or passenger in a vehicle are well known and are standard OEM equipment on most passenger cars. However, such OEM restraint systems do not provide adequate protection for a child under the approximate age of 8 years, for reasons such as the following:

The seatbelts are not sufficiently snug on a small body and do not comprise, provide or impose a sufficient downwards force.

The shoulder belt could rub against the child's neck.

Most children are not mature enough to be seated in a seat designated for adults.

The National Highway Traffic Safety Administration (NHTSA) recommends that rear-facing seats be used in the back seat for children from the age of birth to at least 1 year old and at least 20 pounds. Forward-facing toddler seats are to be used in the back seat for children from age 1 and 20 pounds to about age 4 and 40 pounds. Booster seats are to be used in back seat for children from about age 4 to until they are at least 8 years old, unless they are 4'9" tall. Safety seat belts are to be used for children at age 8 and older or taller than 4'9". All children age 12 and under should ride in the back seat of a vehicle.

Booster seats are used because safety seat belts in vehicles are not designed for children. Beginning at about 4 years of age, many children have outgrown toddler seats but still they are too small for adult-sized vehicle safety seat belts. A booster seat raises the child up so that a safety seat belt properly fits—and can better protect the child. The NTHSA recommends that children who have outgrown child safety seats should be properly restrained in booster seats (which boost a child to a height where the adult lap-and-shoulder belts fit properly) until they are at least 8 years old, unless they are 4'9" tall.

Nonetheless, well before children are 8 years old or 4'9" tall, parents start encountering resistance from their "big" children against the use of the booster seat, a feature seemingly associated with being considered still a "small kid" or child. At the same time, by that age, children are well accustomed to carrying a back-pack for extended time throughout their day, and are very comfortable with wearing a backpack's shoulder straps wrapped tightly around their upper body.

From the point of view of a child who is not yet 8 years old or 4'9" tall, it would be very desirable if a vehicle could be fitted with an effective and regulation-compliant restraint system that does away with the booster seat and uses padded shoulder straps modeled after a backpack's shoulder straps. It would also be desirable for such restraint system to be easy to install in a variety of vehicle and seat configurations, comfortable for the child, easy to adjust for the child's size, and easy to remove when not needed. Despite this long-felt need in the market, it does not appear that such restraint systems exist to meet the above-described user requirements.

SUMMARY

Restraint systems as disclosed herein are specially engineer to address the unmet need described above by providing a child/passenger restraint system that uses padded shoulder straps modeled after a backpack's shoulder straps or the like. Restraint systems as disclosed herein can replace a booster seat, are easy to install in a variety of vehicle and seat configurations, are comfortable for the child to wear, are easy to adjust for the child's size, and are easy to remove when not needed.

Restraint systems as disclosed herein are provided in the form of an add-on restraint system or restraining device, which may be user-mounted to the vehicle seat of any of a number of vehicles such as cars, school buses, tour buses, vans, SUVs, recreational vehicles (RVs), airplanes, watercraft, and other vehicles or modes of conveyance, such as for example ski lifts or the like, without limitation.

Such restraint systems as disclosed herein take advantage of existing anchor points fitted from the factory on or around the seats of vehicles. In particular, the well-known LATCH system ("Lower Anchors and Tethers for Children"), as well as the ISOFIX system (the International Organization for Standardization standard ISO 13216) define standard attachment points to be manufactured into cars, as follows: a single attachment at the top (top tether anchor), and two attachments at the base of each side of the seat (Lower Anchors).

In one example embodiment, restraint systems as disclosed herein comprise two lap-belts segments each attached to the respective lower anchors of the LATCH system, wherein the lap-belt segments are connected with one another at a front location by a connecting element such as a central locking buckle or the like. After connecting to the lower LATCH anchors on each side, each of the two lap-belt segments continue behind the back of the passenger, where they cross each other, and then become two shoulder straps which go over the user's shoulders and then join the lap-belt segments on each side of the central locking buckle. A central vertical belt is positioned behind the head and shoulders of the passenger, wherein the central vertical belt is attached at its top end (preferably via a belt retractor device) to an attachment point with the vehicle that may be a top tether anchor of the LATCH system. The vertical belt is attached at its lower end to a connection member, e.g., a three-way buckle, used to connect with the shoulder straps, and where the shoulder straps cross each other.

In an another example embodiment, restraint systems useful for restraining an occupant within a vehicle seat as disclosed herein comprise a lap belt comprising two lap-belt segments extending from respective connection points with a vehicle seat or vehicle, and a connecting member for releasably attaching portions of the lap-belt segments together, wherein the lap belt is disposed over the pelvis of an occupant when seated. In an example, the connecting member for the lap-belt segments may be a mating buckle/latch assembly or the like. In an example, the pair of lap-belt segments are each connected with respective anchor connectors that are connected with the vehicle. The lap-belt segments may be disposed though openings in the anchor connectors. In another example, the lap-belt segments are connected with a horizontal element that is disposed across the bottom portion of the seat, and that is fixedly connected with the vehicle seat or the vehicle.

The restraint system includes a connecting element that may be connected with any one of the lap belt, the vehicle seat, and a vehicle attachment point. In an example, the connecting element may be attached with the horizontal element. The connecting element extends upwardly along a back portion of the vehicle seat to a connecting member. In another example, the connecting element may be connected with the lap-belt segments, and in a particular such example the connecting element is a pair of straps that may be integral with respective lap-belt segments. A vertical belt extends from the connecting member in a general upward direction along the back portion of the vehicle seat to an attachment point within the vehicle. In an example, the attachment point may be one configured to control forward movement of an occupant seated in the vehicle within the system, e.g., in the event of a sudden stop or collision.

In an example, the connecting member is positioned along the back portion of the seat behind an occupant when seated in the vehicle seat. A pair of shoulder straps extend from the connecting member and are configured to permit placement over each respective shoulder of an occupant seated within the vehicle seat. In an example, the connecting element is integral with the pair of shoulder straps. In such example, the connecting member may be configured to accommodate cross-over placement of the pair of straps relative to one another. In an example, the lap belt, connecting element, and shoulder straps are all integral with one another forming a one-piece construction. Configured in this manner, the lap belt and shoulder straps operate together to restrain movement of an occupant in the vehicle.

In an example, the restraint system may include a pair of intermediate straps extending from respective lap-belt segments to respective shoulder straps, and any one of more of the lap-belt, intermediate straps and shoulder straps may be adjustable relative to one another to provide a desired restraining fit of the occupant within the system.

Restraining systems as disclosed herein may be used in the following manner. By Attaching the pair of lap-belt segments to a connection point with the vehicle seat or the vehicle. The connecting element is positioned in a manner upwardly along a back portion of the vehicle seat from its connection with one of the lap belt, the vehicle seat, and an attachment point with the vehicle. The Shoulder straps extend from the connecting member in a manner facilitating placement over the shoulders of the occupant once seated. The vertical strap is attached in a manner extending generally upwardly from the connecting member along the seat back portion to an attachment point within the vehicle. An occupant is seated onto the seat and the lap-belt segments are combined together over a pelvis portion of the occupant, the shoulder straps are placed over the shoulders of the occupant, and a releasable attachment is formed between the combined lap-band segments via an attachment member to thereby restrain the occupant in the vehicle seat.

In an example where the lap-belt segments are connected or integral with the respective shoulder straps, during the step of combining the lap-belt segments this also operates to retain placement of the shoulder straps over the occupant. In such example, the length of the shoulder straps may be adjusted by movement of the lap-belt segments relative to their connection points with the vehicle seat or vehicle. In an example where the restraint system includes intermediate straps connecting the lap belt to the shoulder straps, the length of the shoulder straps may be adjusted by moving one of the shoulder straps or the intermediate straps relative to the other one of the shoulder straps or the intermediate straps.

BRIEF DESCRIPTION OF THE DRAWINGS

These and other features and advantages of restraint systems as disclosed herein will be better appreciated as the same becomes better understood by reference to the following detailed description when considered in connection with the accompanying drawings wherein.

DETAILED DESCRIPTION

Figure 1:
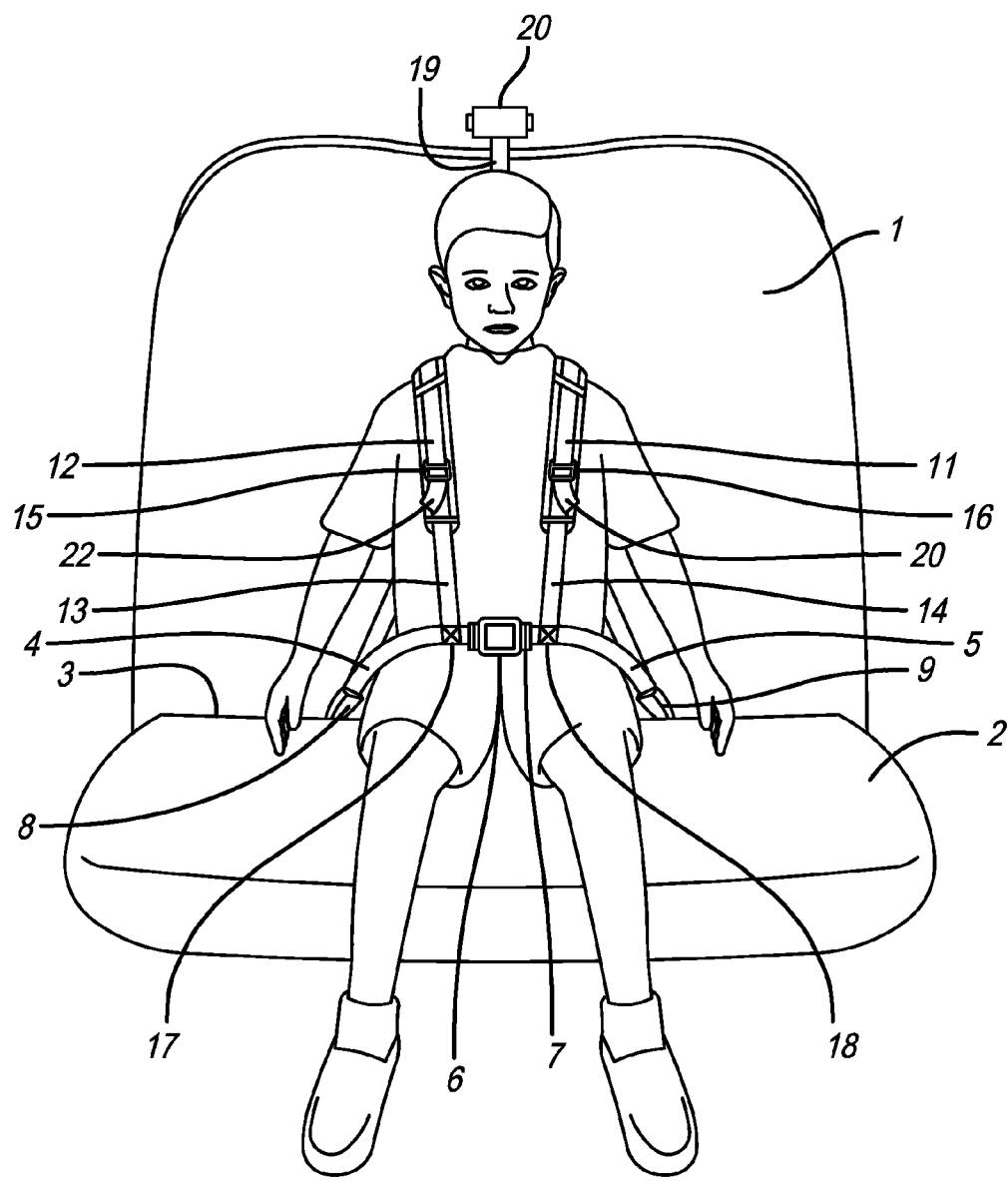
FIG. 1 is a frontal view of an example restraint system as disclosed herein as used for restraining placement of a human passenger in a vehicle seat.

For the purposes of promoting an understanding of the principles of restraint systems as disclosed herein, reference will now be made to an example embodiment illustrated in the drawings, and specific language will be used to describe same. It will nevertheless be understood that no limitation of the scope of restraint systems as disclosed herein is thereby intended, and that alterations and modifications to the illustrated device, and further applications of the principles of the restraint systems as disclosed and illustrated that would normally occur to one skilled in the art are all intended to be within the scope of restraint systems as disclosed herein.

Figure 2:
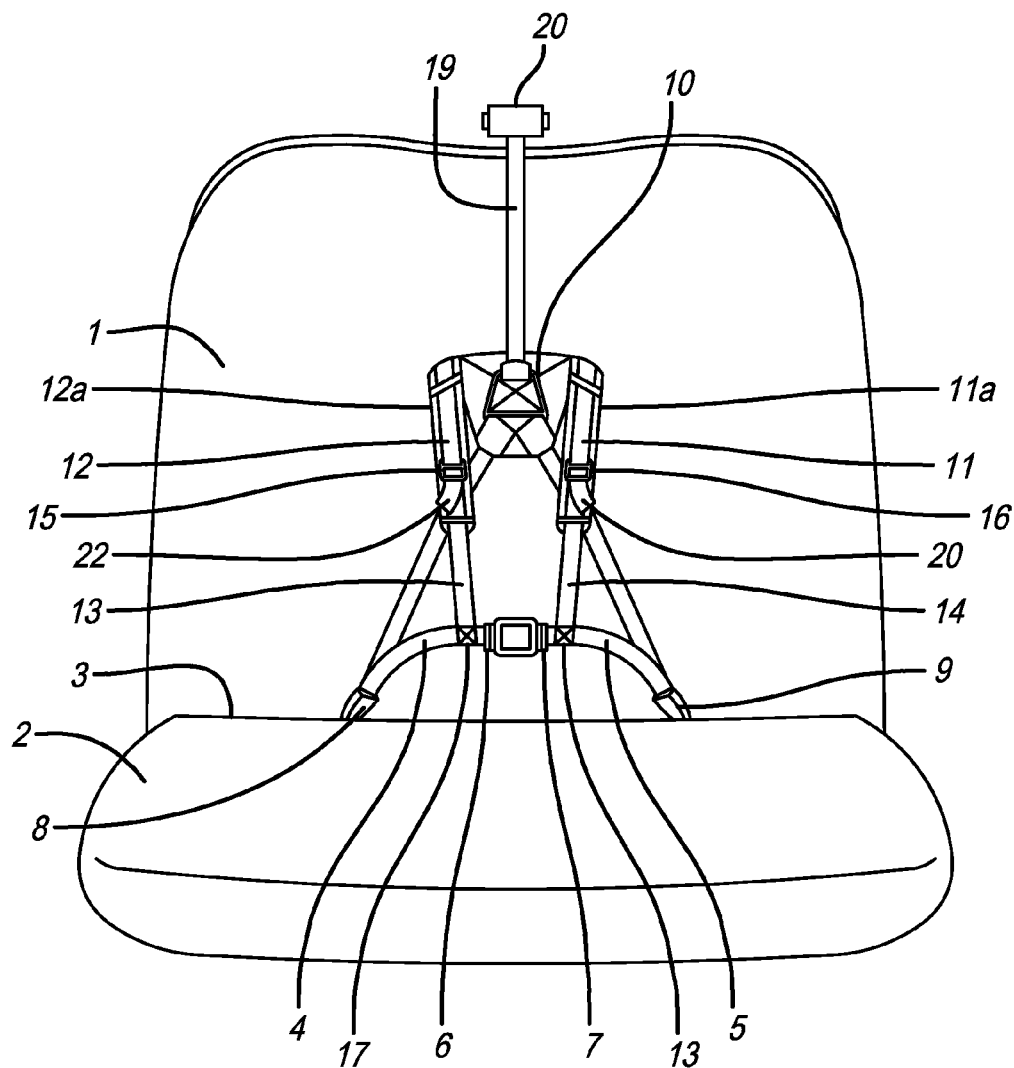
FIG. 2 is a frontal view of the example restraint system of FIG. 1 with the human passenger removed to better illustrate the routing of straps behind the back of the user.

Referring now to restraint systems as disclosed herein in more detail, as depicted in FIGS. 1 and 2, an example restraint system is configured for use with a typical vehicle seat comprising a generally vertically extending back portion 1 and a generally horizontally extending seat portion 2. The back portion or seat back 1 and the seat portion or seat bottom 2 converge and meet in an area generally known as the bight 3 of the seat. For vehicles and seats fitted from the factory with the LATCH system or with the ISOFIX system, two standardized Lower Anchors are generally provided within the bight 3 of the seat (the Lower Anchors are not shown in the drawings, but are well-known in the restraints art). The Lower Anchors are disposed generally symmetrically on each side of a region where the passenger is expected to seat, at a standardized distance of 280 mm apart from each other. The Lower Anchors may be attached to floor portion of the vehicle or some other stable and fixed attachment point of the vehicle.

In an example embodiment, the restraint system comprises a lap-belt comprising a left lap-belt segment 4 and a right lap-belt segment 5. The ends of the lap-belt segments 4 and 5 are fitted together with connecting members, that may be provided in the form of a mating buckle/latch assemblies 6 and 7, that are releasably securable to one another in order to fasten the lap-belt segments together in a generally centered position around a human occupant's pelvis, as is well known in the restraints art. At the opposite ends, each lap-belt segment 4 and 5 is respectively routed (sliding freely) through the loop end of each of two Lower Anchor Connectors; namely, a left Lower Anchor Connector 8 and a right Lower Anchor Connector 9.

In normal use, the left and the right Lower Anchor Connectors 8 and 9 are positioned and attached to the respective Lower Anchors, as seen in FIGS. 1 and 2 (in which the attached ends of the Lower Anchor Connectors 8 and 9 are not visible, being buried in the bight 3 of the seat, where the Lower Anchors are generally located). In an example embodiment, the left and the right Lower Anchor Connectors may be European style "alligator-like" clips, or the open-clip style connectors commonly used in the United States/Canada, but other embodiments of the restraint system as disclosed herein may use any other known type of Lower Anchor Connectors, as long as they are able to securely connect to the Lower Anchors pre-existing in the car under the LATCH system or under the ISOFIX system, or to any other type of anchoring points present at or around the bight 3 of the seat.

After passing through the loop-end of the Lower Anchor Connectors 8 and 9, the lap-belt segments 4 and 5 continue upwards behind the back of the passenger (resting relatively flat between the seat back 1 and the back of the passenger, for minimal discomfort). At some point (preferably located at the same height as the shoulders of the passenger), the lap-belt segments 4 and 5 cross each other by being slideably routed through connecting member, for example in the form of a three-way buckle 10. Upon crossing each other, the left lap-belt segment 4 becomes the right shoulder strap 11, and the right lap-belt segment 5 becomes the left shoulder strap 12. The shoulder straps 11 and 12 preferably have a structure, functionality, and styling of shoulder straps suitable for fitting over the shoulders of an occupant, such as that used in back-packs for school or for hiking or the like. At the same time, the shoulder straps 11 and 12 are reinforced and of sufficient strength to satisfy the requirements for shoulder safety belts in a passenger vehicle.

In an example embodiment, the shoulder straps 11 and 12 are respectively routed through two shoulder pads 11a and 12a, which are interposed between the child's body and the shoulder straps 11 and 12 (optional for user comfort), similar to the padding commonly added under the shoulder straps of a back-pack or the like. In a further example embodiment, the shoulder pads 11a and 12a may continue behind the shoulders of the passenger and form a unitary assembly with a larger cushioning pad which is preferably placed between the passenger's back and the connecting member or three-way buckle 10, so as to prevent passenger discomfort. The trapezoidal contour of such larger cushioning pad is depicted in FIG. 2 as a dotted line around the three-way buckle 10, but any other shapes may optionally be used for such cushioning pad.

At their ends opposite the three-way buckle 10, each of the two shoulder straps 11 and 12 are respectively connected to two intermediate straps or length-adjustable straps (a left length-adjustable strap 13 and a right length-adjustable strap 14) via two buckles 16 and 15, which buckles are preferably of a type known as Tension Lock or Ladder Lock. The shoulder straps 11 and 12 are fixedly attached to one part of the respective buckles 16 and 15, for example may be looped through a portion of the buckle and sewn therearound, and the buckles 16 and 15 are configured having the further Tension Lock or Ladder Lock friction-lock element for accommodating placement of respective adjustable straps 14 and 13 therein. Once the ends of the adjustable straps 14 and 13 are disposed through the respective buckles 16 and 15, ends 21 and 22 of the straps 14 and 13 may be grasped and used for setting the desired length adjustment and fitment of the occupant within the restraint system.

The shoulder straps 11 and 12 and the length-adjustable straps 13 and 14 are not permanently affixed to the shoulder pads 11a and 12a, but rather routed through loops (depicted as dark grey bands in FIG. 2), sown or otherwise disposed on the shoulder pads 11a and 12a. This arrangement allows the user to adjust the length of the straps 11, 12, 13 and 14 without interference from the shoulder pads 11a and 12a. At their ends opposite the buckles 15 and 16, the length-adjustable straps 13 and 14 are permanently attached, in a generally perpendicular configuration, to the corresponding lap-belt segments 4 and 5, at two attachment points 17 and 18, proximal to the buckle/latch 6 and 7, respectively on each side of the buckle/latch 6 and 7. Such permanent attachment between each length-adjustable strap and the corresponding lap-belt segment is preferably effected by stitching or sowing, but any suitable means of permanent attachment can be used.

A central vertical belt 19 is connected to the three-way buckle 10 (and therefore is also connected to the shoulder straps 11 and 12 which pass through the three-way buckle 10). Within the three-way buckle 10, the two shoulder straps 11 and 12 cross each other and they may also cross the vertical belt 19.

At its end opposite the three-way buckle 10, the vertical belt 19 is attached to the Top Tether Anchor (not shown in the drawings) of the LATCH system, preferably via a lockable retractor reel 20 which allows the vertical belt 19 to extend and permit freedom of movement, but which locks in response to an actual or anticipated forward inertial pull on the vertical belt 19. An optional belt pre-tensioner (not depicted in FIGS. 1 and 2) may also be provided for the vertical belt 19 in conjunction with the retractor reel 20, as is well known in the restraints art. In alternative embodiments, the anchoring end of the vertical belt 19 may be attached to any other suitably strong known anchor points on or behind the seat of a vehicle, with or without a retractor reel.

Example embodiments of restraint systems as disclosed herein may be sold as an add-on restraint system for children under the age of 8 years or under 4'9" tall. The parents or other responsible adults are expected to read the installation instructions and to install such restraint system in a vehicle, on their own or, optionally, under the guidance of a more qualified person, such as a firefighter or a police officer. Such add-on restraint systems as disclosed herein are preferably sold with the lap-belt segments 4 and 5 already threaded through the loop-end of the Lower Anchor Connectors 8 and 9, and with the shoulder straps 11 and 12 already crossed at the back (and already threaded through the three-way buckle 10), and also with the vertical belt 19 already attached at one end to the three-way buckle 10.

Restraint systems as disclosed herein may be installed and used, e.g., by following these steps:
  Selecting the desired position for the child in the vehicle, and identifying the location of the corresponding anchoring points for the LATCH system, namely the two Lower Anchors and the Top Tether Anchor, or any other suitable anchor points.
  Securely connecting the Lower Anchor Connectors of the restraint system to the Lower Anchors;
  According to the child's body size, adjusting the length-adjustable straps 13 and 14, ensuring that the three-way buckle 10 is positioned at approximately shoulder height behind the back of the child, and ensuring that the buckle/latch 6 and 7 is centered on the child's pelvis.

Securely connecting the end of the vertical belt 19 to the Top Tether Anchor of the LATCH system (preferably via the retractor reel 20).

Placing the child on the selected seating area, approximately at the mid-way point between the two Lower Anchors of the LATCH system, positioning each shoulder of the child under the respective shoulder straps 11 and 12, and connecting buckle 6 to the latch 7, ensuring that buckle/latch 6 and 7 of the lap belt are centered on the child's pelvis.

If needed, adjusting the length-adjustable straps 13 and 14, ensuring that the shoulder straps 11 and 12 are snug against the child's body, and ensuring that the three-way buckle 10 is positioned at approximately shoulder height behind the back of the child.

If needed, adjusting the tension in the vertical belt 19, ensuring that vertical belt 19 is taut.

In alternative embodiments and uses, the add-on restraint system as described herein may be installed and used even in vehicles not pre-fitted with the LATCH system or with the ISOFIX system, or in situations where the weight of the child exceeds the load allowed on the LATCH or on the ISOFIX system. To function as envisioned, the add-on restraint system described herein only requires two suitably strong lower anchoring points (one on each side of the passenger, preferably at or below the level of the bight 3 of the seat) and one anchoring point for the top end of the vertical belt 19, which can be anchored to any suitably strong known anchor points on, above or behind the seat of a vehicle (or even to the ceiling, the floor, or to the side pillar of a vehicle, or any other structural element or portion of the vehicle if routed properly).

In further alternative embodiments, the add-on restraint system as described herein can be adapted to use the existing 3 (three) anchoring points of the common 3-point seat belt system installed by manufacturers in the vast majority of the vehicles produced today. In this particular configuration, the vertical belt 19 as disclosed herein would be replaced by the shoulder strap of a regular 3-point seat belt system, such shoulder strap being routed behind the back of the passenger, and such shoulder strap being routed through the three-way buckle 10 of the restraint system, properly positioned at approximately shoulder height behind the back of the child. The two Lower Anchor Connectors of restraint systems as disclosed herein would have to be replaced with other suitable connectors known in the art, to allow them to connect securely to the two lower (lap) anchor points of a regular 3-point seat belt system.

Figure 3:
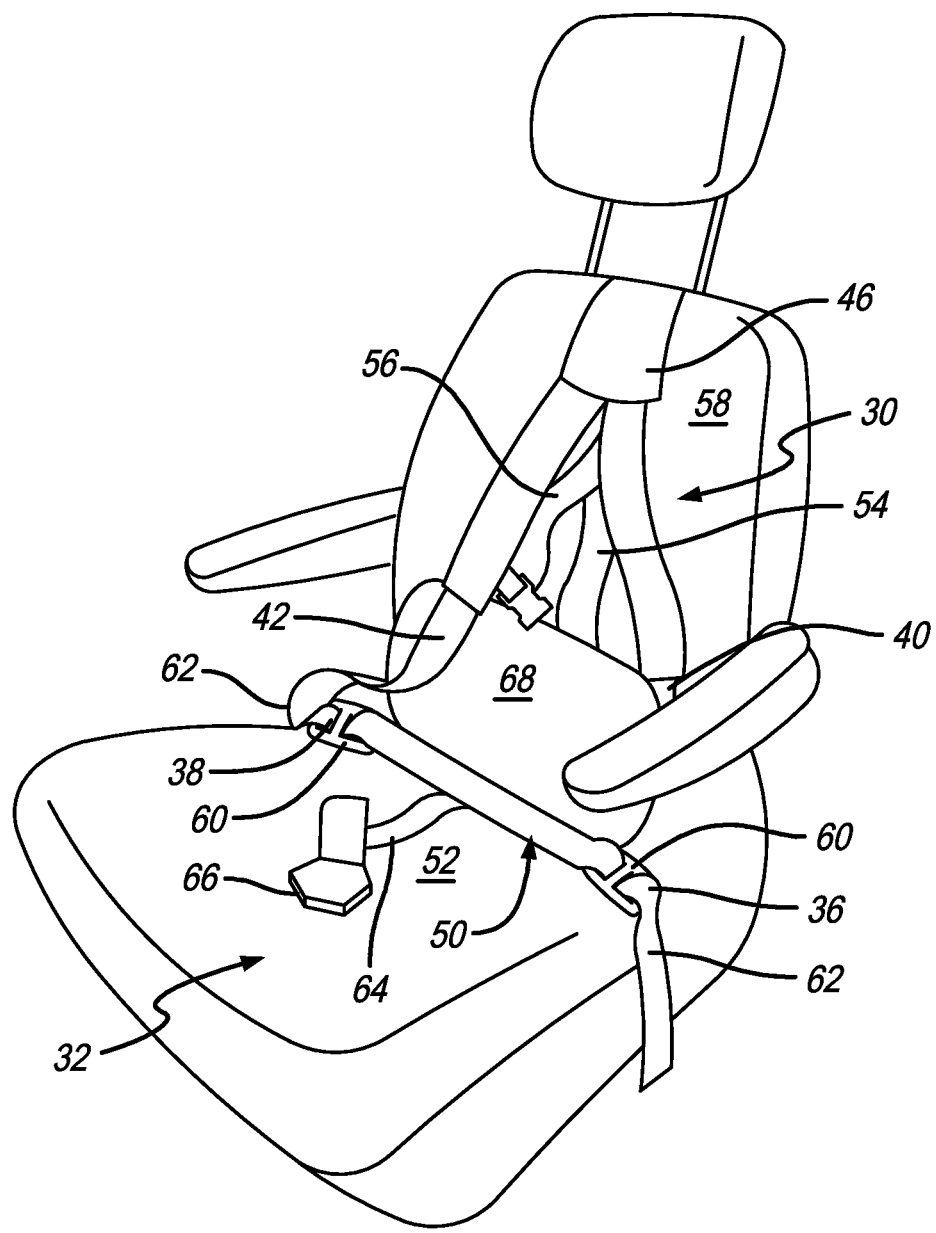
FIG. 3 is a perspective view of an example restraint system as disclosed herein as used for restraining placement of a human passenger in a vehicle seat.
Figure 4:
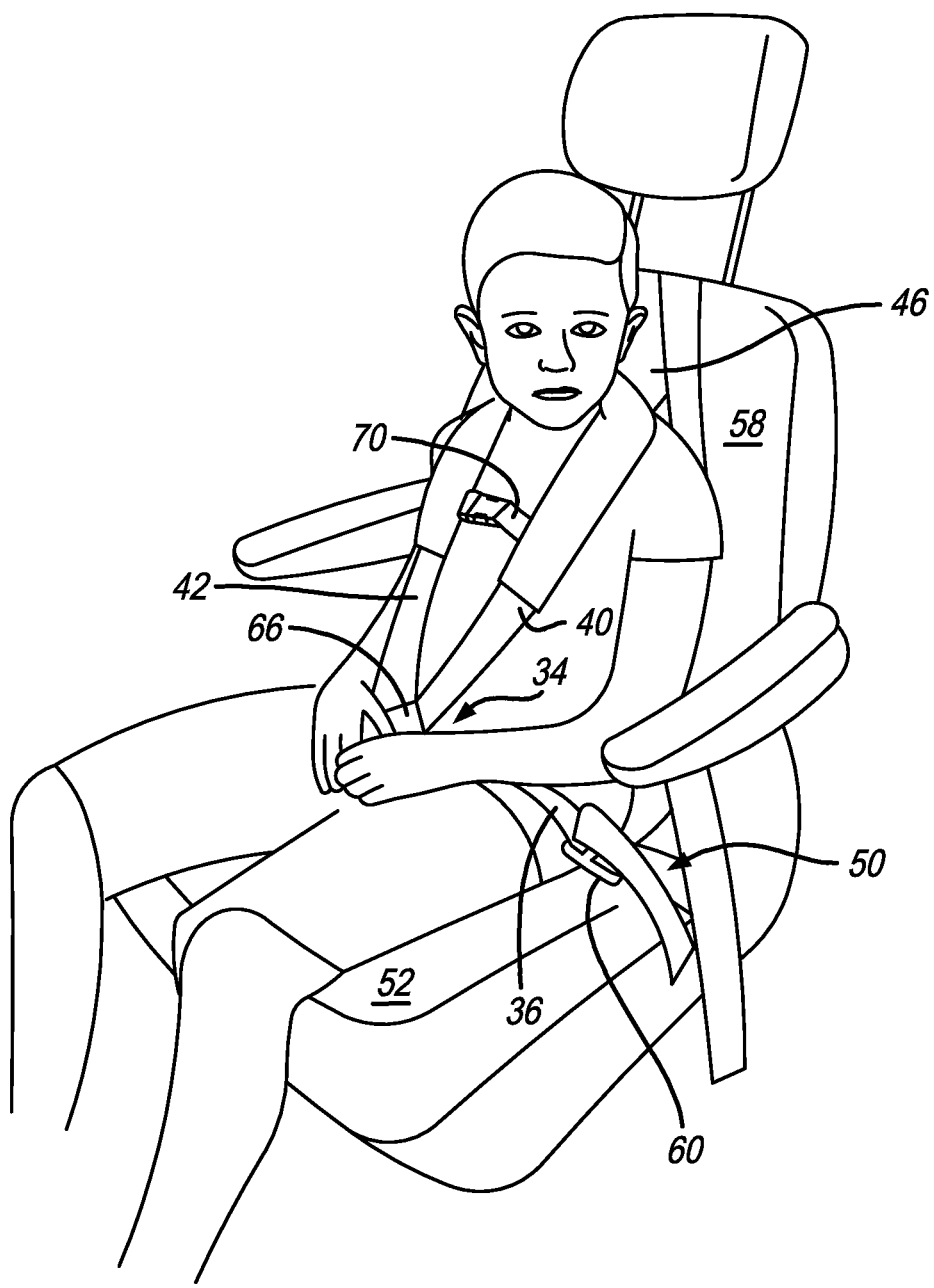
FIG. 4 is a perspective view of the example restraint system of FIG. 3 with a human passenger disposed therein.

FIGS. 3 and 4 illustrate another embodiment restraint system 30 as disclosed herein for restraining placement of a human occupant within a vehicle seat 32. The restraint system 30 comprises a lap belt 34 comprising a pair of lap-belt segments 36 and 38 that are connected with, and in a preferred embodiment integral with, respective shoulder straps 40 and 42 that each extend from a connecting member 46. In this particular embodiment, the restraint system is attached to the seat bottom by a horizontal element or strap 50 running along the seat bottom 52 and fixedly positioned thereon such that the occupant sits on when seated in the vehicle seat 32. In an example, the horizontal element can be attached to the vehicle seat and/or to an attachment point with the vehicle A connecting element in the form of a pair of straps 54 and 56 is attached to the horizontal strap 50 and extends upwardly along the seat back 58. In an example, the straps 54 and 56 connect with the connecting member 46 and cross over to form the respective shoulder straps 40 and 42. Thus, unlike the restraint system embodiment disclosed above and illustrated in FIGS. 1 and 2, the restraint system 30 of this example does not have lap-belt segments that are each disposed through anchor connectors, but rather the lap-belt segments are connected to opposed sides of the fixed horizontal strap 50 via suitable fasteners 60 or the like, and have attachment members 62 that are slidably disposed along each of the respective lap belt segments 36 and 38.

In the embodiment illustrated in FIGS. 3 and 4, the restraint system 30 makes use of an optional crouch strap or element 64 that is attached to and extends from the horizontal strap 50 that includes a connecting member 66 disposed at an end thereof for connecting with each of the lap-belt segments attachment members 62 to thereby provide the lap belt positioned over the occupant's pelvis when the occupant is seated in the vehicle. If desired, a pad 68 or other type of generally flat member may optionally be provided and positioned along a base portion of the seat back 58 for purposes of comfort and/or for containing and routing the connecting element or straps 54 and 56 therebehind or therethrough. Also, optional padding may be placed over at least a portion of the shoulder straps 40 and 42 and/or the connecting element 46 to provide added comfort to the occupant. A feature of this particular embodiment is that it does not make use of the intermediate straps present in the earlier-described embodiment to connect the shoulder straps to the lap belt, and the shoulder straps and lap-belt segments are in fact formed from the same continuous strap running along a front portion of the occupant's body.

The restraint system 30 is used by the occupant sitting in the vehicle seat 32, sitting on the horizontal strap 50 with the connecting element or straps 54 and 56 behind their back, and placing the shoulder straps 40 and 42 over each shoulder. Then taking the crouch strap 64 and placing it upward between the occupant's legs to a position adjacent the pelvis. The occupant then takes each of the attachment elements 62 at each side of the lap-belt segments 38 and 38 and pulls them towards the connecting member 66 of the crouch strap, and releasably attaches each of the attachment elements 62 to the connecting member to thereby form the lap belt over the occupant's pelvis and draw the shoulder straps 40 and 42 toward each other to thereby restrain the occupant within the vehicle seat. As noted, the crouch strap is optional, and in alternative embodiment, the lap belt may be provided by using attachment elements capable of providing a releasable attachment with each other. Also, if desired, the restraint system may include a connection element 70 for purposes of drawing the shoulder straps together in front of the seated occupant, e.g., across the occupant's chest.

With regard to materials useful for making restraint systems as disclosed herein, any suitable material known in the art of passenger restraint systems can be used for belts, straps, connectors, loops, retracting reels, anchors, buckles and latching means.

While particular examples of restraint systems have been disclosed and illustrated for purposes of reference, it is to be understood that restraint systems that may be configured differently to provide a similar function are intended to be within the scope of this description. For example, while an example restraint system has been disclosed as comprising a lap belt that is provided as two lap-belt segments that each extend at one end from a connecting member through loop ends of two Lower Anchor Connectors, and extend further to form shoulder straps, in an alternative embodiment, the two lap-belt segments may be configured to fixedly connect with (and not looped though) the Lower Anchor Connectors or other type of attachment point provided at or adjacent the bight of the seat, such as that illustrated in the embodiment of FIGS. 3 and 4. In such a configuration, one or both of the lap-belt segments may be configured having an adjustment element, which may be part of the connection element, to provide a desired fit across the pelvis of an occupant. In such embodiment, separate lap-belt segments would extend upwardly from each of the Lower Anchor Connectors or other connection point to provide the shoulder straps used in the restraint system. In another alternative embodiment, the shoulder straps may be configured to provide a desired degree of length adjustment, this in place of or in addition to the embodiment disclosed and illustrated above where the length adjustment is provided by the intermediate straps. Further, while example restraint systems disclosed and illustrated above make use of a pair of straps running upwardly along the seat back to the connecting member and shoulder straps extending therefrom, restraint systems within the scope as disclosed herein may make use of a connection element in the form of a single strap, multiple straps, or any other type or configuration of element connected with an attachment point of the system or seat that extends therefrom to a connecting member having shoulder straps connected with or extending therefrom. For example, such connecting element may be a single strap running along the seat back from an attachment point adjacent the blight of the seat (that may be part of the system or part of the vehicle) that extends to a connecting member, wherein the connection member includes a pair of shoulder straps extending therefrom for use as disclosed above with the restraint system. These are but a few examples of how restraint systems as disclosed herein may be alternatively configured while being within the scope of restraint systems as disclosed herein Thus, while the foregoing written description of example embodiments of restraint systems as disclosed enables one of ordinary skill to make and use what is considered presently to be the best mode thereof, those of ordinary skill will understand and appreciate the existence of variations, alternatives, combinations and equivalents of the specific embodiments, systems, methods and examples that are intended to be within the scope of such restraint systems as disclosed herein. Accordingly, restraint systems as disclosed herein should therefore not be limited by the above described embodiments, systems, methods and examples, but by all embodiments systems and methods within the scope and spirit of restraint systems as disclosed herein.

What is claimed is:

1. A system for retraining an occupant within a vehicle seat comprising:
    a lap belt comprising a pair of lap-belt segments each fixedly attached at one end with the vehicle seat or vehicle, and an attachment member for releasably attaching other ends of the lap-belt segments together, wherein the lap belt is disposed along a bottom portion of the vehicle seat for placement over the lap of an occupant;
    a pair of connecting elements connected with any one of the lap belt segments, the vehicle seat, and the vehicle, and each extending upwardly along a front surface of a back portion of the vehicle seat to a connecting member, wherein the connecting member is positioned at shoulder height along the front surface of the back portion of the vehicle seat and the pair of connecting elements are disposed through the connecting member;
    a pair of shoulder straps extending from the connecting member and each shoulder strap formed from a respective one of the pair of connecting elements, wherein the shoulder straps are configured for placement over each shoulder of an occupant seated on the vehicle seat and extend downwardly from the shoulders towards the lap belt, wherein the shoulder straps are connected with respective lap belt segments at a position away from and independent of the attachment member such that an occupant sitting in the vehicle seat is restrained by both the lap belt and shoulder straps; and
    a vertical belt extending from the connecting member in a general upward direction along the back portion of the vehicle seat to an attachment point within the vehicle.

2. The system as recited in claim 1 wherein the pair of lap-belt segments are each connected at the one end with respective anchor connectors that are connected with the vehicle.

3. The system as recited in claim 2 wherein each of the lap-belt segments are disposed though openings in the anchor connectors and are connected with respective connecting elements.

4. The system as recited in claim 1 wherein the connecting elements are a pair of straps that are integral with one or both of respective lap-belt segments and respective shoulder straps.

5. The system as recited in claim 1 wherein the pair of connecting elements are integral with the shoulder straps, and wherein the connecting member accommodates cross-over placement of the connecting elements therethrough relative to one another such that one connecting element of the pair of connecting elements on one side of the occupant forms the shoulder strap that extends over the shoulder on the other side of the occupant.

6. The system as recited in claim 1 further comprising pads members that are connected with the shoulder straps and that are interposed between the straps and the occupant when placed in the system.

7. The system as recited in claim 1 further comprising a pair of intermediate straps that are attached to respective lap-belt segments and that are connected with respective shoulder straps, and wherein any one or more of the lap-belt, intermediate straps and shoulder straps are adjustable to provide a desired restraining fit of the occupant within the system.

8. The system as recited in claim 7 wherein the intermediate straps and respective shoulder straps are adjustably connected to one another to provide a desired restraining fit of the occupant within the system.

9. The system as recited in claim 1 further comprising a lockable retractor reel and wherein an end of the vertical belt opposite the connecting member is connected with the lockable retractor reel.

10. A restraint system for retraining an occupant within a vehicle seat comprising:
    a lap belt comprising lap-belt segments extending from connection points with the vehicle seat or the vehicle, and an attachment member for releasably attaching the lap-belt segments together to form the lap belt, wherein the lap belt is disposed over the pelvis of an occupant when seated in the vehicle seat;
    a pair of connecting elements connected with at least one of the lap belt, an attachment point with the vehicle seat, and an attachment point with the vehicle each of which positioned adjacent a bottom portion of the vehicle seat, and extending upwardly along a front surface of a back portion of the vehicle seat to a connecting member positioned behind an occupant when seated in the vehicle seat;

a pair of shoulder straps extending from the connecting member and integral with respective connecting elements, wherein the pair of shoulder straps are configured to permit placement over respective shoulders of an occupant when seated within the vehicle seat, and wherein the shoulder straps extend downwardly and are connected with respective lap-belt segments independent of the attachment member; and a vertical belt extending from the connecting member in a general upward direction along the back portion of the vehicle seat to an attachment point within the vehicle.

11. The system as recited in claim 10 wherein the connecting elements are movable in the connecting member.

12. The system as recited in claim 10 wherein lap-belt segments are integral with respective connecting.

13. The system as recited in claim 10 further comprising a lockable retractor reel and wherein an end of the vertical belt opposite the connecting member is connected with the lockable retractor reel.

14. The system as recited in claim 10 wherein connecting member is positioned behind the shoulders of an occupant when seated in the vehicle seat.

15. The system as recited in claim 10 further comprising intermediate straps extending between the lap-belt segments and respective shoulder straps, wherein the intermediate straps are adjustably connected with respective shoulder straps at one end and are attached to the lap-belt segments at an opposite end.

16. The system as recited in claim 1 wherein the connecting elements cross over one another in the connecting member such that the respective shoulder straps extending from the connecting member are located at opposite sides relative to the respective connecting elements.

17. A method for restraining placement of an occupant seated in a vehicle seat comprising the steps of:

attaching a pair of lap-belt segments to connection points with the vehicle seat or the vehicle;

positioning a pair of connecting elements running upwardly along a front surface of a back portion of the vehicle seat from one of respective lap belt segments, the vehicle seat, and an attachment point with the vehicle to a connecting member positioned on the front surface of the back portion of the vehicle seat, wherein shoulder straps extend from the connecting member in a manner facilitating placement over the shoulders of the occupant once seated, wherein the shoulder straps are integral with respective connecting elements, and wherein the connecting elements cross over one another through the connecting member, and wherein the shoulder straps are connected with respective lap-belt segments away and independent of an attachment member used to connect the lap-belt segments together;

attaching a vertical strap extending generally upwardly from the connecting member along the front surface of the back portion of the vehicle seat to an attachment point within the vehicle; and seating the occupant onto the vehicle seat and combining the lap-belt segments together over a pelvis portion of the occupant, and placing the shoulder straps over the shoulders of the occupant, and forming a releasable attachment between combined portions of the lap-belt segments via the attachment member.

18. The method as recited in claim 17 wherein the step of combining the lap-belt segments together operates to bring the shoulder straps towards each other into a desired placement position over the occupant.

19. The method as recited in claim 17 wherein the shoulder straps are connected with the lap belt respective lap-belt segments by intermediate straps attached to the lap-belt segments, the method further comprising adjusting the position of the shoulder straps relative to the lap belt by movement of one of the intermediate straps and shoulder straps relative to the other of the intermediate straps and shoulder straps.

20. The method as recited in claim 17 wherein during the step of positioning, moving the connecting elements within the connecting member to provide a desired placement position of the connecting member relative to the occupant when seated.

* * * * *